(12) United States Patent
Smith et al.

(10) Patent No.: US 7,703,097 B2
(45) Date of Patent: Apr. 20, 2010

(54) AUTO-COMMIT PROCESSING IN AN IMS BATCH APPLICATION

(75) Inventors: Alan R. Smith, Gilroy, CA (US); James C. Wright, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1821 days.

(21) Appl. No.: 10/298,136

(22) Filed: Nov. 15, 2002

(65) Prior Publication Data

US 2004/0098719 A1    May 20, 2004

(51) Int. Cl.
G06F 9/46 (2006.01)
(52) U.S. Cl. ...................................... 718/101
(58) Field of Classification Search ................ 718/101
See application file for complete search history.

(56) References Cited

U.S. PATENT DOCUMENTS

| | | | |
|---|---|---|---|
| 5,857,204 A | 1/1999 | Lordi et al. ................. | 707/202 |
| 5,923,832 A | 7/1999 | Shirakihara et al. ..... | 395/182.13 |
| 5,953,719 A | 9/1999 | Kleewein et al. ............... | 707/8 |
| 5,983,361 A | 11/1999 | Lee et al. ....................... | 714/19 |
| 6,122,640 A | 9/2000 | Pereira ...................... | 707/103 |
| 6,243,715 B1 | 6/2001 | Bogantz et al. ............. | 707/201 |
| 6,289,474 B1 | 9/2001 | Beckerle ...................... | 714/37 |
| 6,330,686 B1 | 12/2001 | Denny et al. .................. | 714/4 |
| 6,393,583 B1 | 5/2002 | Meth et al. .................... | 714/12 |
| 6,401,216 B1 | 6/2002 | Meth et al. .................... | 714/16 |
| 2001/0042224 A1 | 11/2001 | Stanfill et al. ................. | 714/16 |
| 2002/0023129 A1 | 2/2002 | Hsiao et al. .................. | 709/205 |

*Primary Examiner*—Meng-Al T. An
(74) *Attorney, Agent, or Firm*—Gregory M. Plow

(57) ABSTRACT

A DLI call from the batch application is intercepted, wherein the DLI call is made for the purpose of accessing a hierarchical database. It is then determined if the access to the hierarchical database is a checkpoint trigger event. A segment counter for a trigger segment in a checkpoint trigger for the checkpoint trigger event is incremented if the trigger segment is identified by the DLI call. The segment counter is compared to a segment commit threshold in the checkpoint trigger and commit point processing is performed on behalf of the batch application if the segment counter is in a predetermined relation to the segment commit threshold.

16 Claims, 9 Drawing Sheets

```
802
804    //L    EXEC PGM=IEWL
806    //SYSLIB    DD DSN=IMSVS.SDFSRESL,DISP=SHR
808    //CKPTLIB   DD DSN=IMS.PGMLIB,DISP=SHR
810    //SYSLMOD  DD DSN=IMS.PGMLIB.DISP=SHR
812    //RESLIB    DD DSN=IMS.SDFSRESL,DISP=SHR
814    //SYSPRINT DD SYSOUT=*
816    //SYSLIN    DD *
818         CHANGE PLITDLI(PLITLI),ASMTDLI(ASMTLI)
820         CHANGE CBLTDLI(CBLTLI),FORTDLI(FORTLI)
822         INCLUDE RESLIB(DFSLI000)
824         CHANGE PLITCKP(PLITDLI),ASMTCKP(ASMTDLI)
826         CHANGE CBLTCKP(CBLTDLI)
828         CHANGE FORTCKP(FORTDLI)
830         INCLUDE CKPTLIB(CKPMOD)
832         ALIAS PLITDLI
834         ALIAS ASMTDLI
836         ALIAS CBLTDLI
840         ALIAS FORTDLI
            NAME CKPLI000(R)
```

Figure 8

```
902
904    //L    EXEC PGM=IEWL
906    //SYSLIB    DD DSN=IMSVS.SDFSRESL,DISP=SHR
908    //CKPTLIB   DD DISP=SHR,DSN=IMS.PGMLIB
910    //APPLLIB   DD DSN=APPL.PGMLIB.DISP=SHR
912    //SYSLMOD  DD DISP=SHR,DSN=IMSVS.PGMLIB
914    //SYSPRINT DD SYSOUT=*
916    //SYSLIN    DD *
918         INCLUDE CKPTLIB(CKPLI000)
920         CHANGE applent(USERPGM)
922         INCLUDE APPLLIB(applpgm)
924         ENTRY CKPTASM
            NAME applpgm(R)
```

Figure 9

AUTO-COMMIT PROCESSING IN AN IMS BATCH APPLICATION

FIELD OF INVENTION

The present invention relates generally to the transparent implementation of commit point processing in stand-alone batch applications (batch applications operating outside of an Information Management System (IMS) online environment) or Batch Message Processing (BMP) batch applications (batch applications running within an online IMS environment). IMS is a trademark of International Business Machines Corporation in the United States, other countries, or both.

More specifically, the present invention relates to a method, program product and apparatus to assist database administrators and application program developers in the incorporation of needed commit point processing into IMS batch applications.

BACKGROUND

IMS is a hierarchical database management system (HDBMS) developed by International Business Machines Corporation. IMS has wide spread usage in many large enterprises where high transaction volume, reliability, availability and scalability are of the utmost importance. IMS provides software and interfaces for running the businesses of many of the world's large corporations. However, companies incorporating IMS databases into their business models typically make significant investments in IMS application programs in order to have IMS perform meaningful data processing work particularly tailored to the needs of their respective enterprises. IMS application programs are typically coded in COBOL, PL/I, C, PASCAL, Java or assembly language. These application programs may perform IMS database functions by making Data Language One (DLI) calls to invoke needed IMS processing.

A batch IMS application program may have been developed to run as a stand-alone batch application outside of the IMS subsystem environment. These programs are characteristically invoked by specifying either "PARM=DLI" or "PARM=DBB" on the Job Control Language (JCL) EXEC statement and are henceforth referred to as DLI/DBB batch applications.

A batch IMS application may also be developed to run as a BMP batch application executing under the control of an IMS subsystem. These programs are characteristically invoked by specifying "PARM=BMP" on the JCL EXEC statement and are henceforth referred to as BMP batch applications.

A batch IMS application, either a DLI/DBB batch application or a BMP batch application, may be initially developed without the deployment of commit point processing. This may be a reasonable development approach at the time an application is originally developed. However, various conditions and environmental factors may change over time making it desirable to add commit point processing at some future time.

For example, a database may grow in size over time such that higher processing volumes are encountered. This can result in excessive contention for record locking resources (such as enqueue/dequeue blocks in IMS), or negatively impact response time where needed segments are locked out from other online applications. Furthermore, without taking frequent commit points, an application may experience a significant recovery cost in the event of an abnormal termination. This is because all of the work performed by the application must be backed out and redone going all the way back to the beginning of the job. This may be an unacceptable impact for an enterprise that is executing long running jobs.

Furthermore, it is frequently desirable for a particular DLI/DBB batch application to be converted to a BMP batch application. For example, program recovery procedures may be greatly simplified by changing from a DLI/DBB batch application to a BMP running under the IMS subsystem. This simplification occurs because the BMP execution environment provides for advanced logging capabilities utilizing a single system log as well as automatic data backout in the case of an abnormal termination. Furthermore, the ability to share critical IMS resources is enhanced under the IMS subsystem since resources may be locked and unlocked dynamically as required, rather than locking these resources for the entire duration of the DLI/DBB batch application. However, converting and running a DLI/DBB batch application as a BMP application may encounter unwanted and unnecessary abnormal terminations when commit point processing is not being performed by the batch application. This is because, within the BMP online processing environment, enqueue/dequeue blocks must be periodically and timely released by an application to avoid exhaustion of the finite supply of these blocks, and it is commit point processing that is used to accomplish this periodic and timely release.

Implementing commit point processing into an existing application may entail a time consuming and error prone manual process to comply with all commit point processing requirements within a BMP environment. It is an object of the present invention to assist the database administrator and database developer with a novel and non-obvious improvement for expediting this aspect of the conversion process.

Therefore, it is frequently necessary for commit point processing to be added to IMS batch applications for a variety of reasons, as briefly discussed supra. However, modifying an IMS batch application program to incorporate commit point processing may be a tedious, complex and error-prone process. For example, following a checkpoint call, all positioning within the IMS database is lost. Therefore, prior to proceeding with the business logic of the batch application at hand, it may be necessary to reestablish all positioning within the database to the state immediately preceding the checkpoint call.

Modifying an existing batch application to incorporate appropriate checkpoint calls and to reestablish proper positioning within a database can be an intimidating task for even the best of programmers. This is because substantial code changes must be made with exacting precision, possibly with minimal program documentation and/or loss of contact with the original developers of the batch application. Many IMS enterprises delay receiving, or entirely forego, the many advantages of commit point processing because of the extensive coding effort, discussed supra, involved with making the transition to a commit point enabled batch application.

Even for a new batch application, where the difficulty of inadequate documentation for an existing application is not a factor, the complexity of implementing commit point processing into the new application may also slow the development process, with significant increase in the coding and testing effort.

Accordingly, there is a great need for a solution to facilitate and expedite the addition of commit point processing to an existing batch IMS application, as well as solutions to speed the development of new batch applications requiring commit point processing.

SUMMARY OF THE INVENTION

To overcome the limitations in the prior art briefly described above, the present invention provides a method, computer program product, and system to automatically perform commit point processing for a batch application. A DLI call from the batch application is intercepted, wherein the DLI call is made for the purpose of accessing a hierarchical database. It is then determined if the access to the hierarchical database is a checkpoint trigger event. A segment counter for a trigger segment in a checkpoint trigger for the checkpoint trigger event is incremented if the trigger segment is identified by the DLI call. The segment counter is compared to a segment commit threshold in the checkpoint trigger and commit point processing is performed on behalf of the batch application if the segment counter is in a predetermined relation to the segment commit threshold. The above-described summary is performed by a routine that is hereinafter referred to as a "DLI intercept routine."

The above method, computer program product and system may further comprise intercepting a transfer of control to the batch application. A checkpoint trigger is established from user supplied data and a supported language is determined. Initial checkpoint logic is deployed using an interface that is consistent with the supported language. The transfer of control to the batch application is then resumed.

In another embodiment of the present invention, the above-described automatic commit point processing may be provided as a computer system. The present invention may also be tangibly embodied in and/or readable from a computer-readable medium containing program code (or alternatively, computer instructions.) Program code, when read and executed by a computer system, causes the computer system to perform the above-described method.

A novel method for executing a batch application, wherein commit point processing is automatically performed without modifying the batch application, is also disclosed. At least one trigger segment is identified and a segment commit threshold associated with the at least one trigger segment is established. A batch front-end routine is linked with the batch application to form an auto-commit batch application, the batch front-end routine having access to the identification of the at least one trigger segment and access to the segment commit threshold. The auto-commit batch application is identified on a Job Control Language (JCL) EXEC statement. A job is submitted comprising the JCL EXEC statement for execution, whereby DLI calls from the auto-commit batch application are intercepted by an auto-commit DLI handler to process the DLI calls and automatically perform commit point processing on behalf of the batch application in accordance with a predetermined relation between the at least one trigger segment and the segment commit threshold. In one embodiment, a DLI intercept routine is linked with a system DLI routine to from the auto-commit DLI handler.

In this manner a batch application, originally implemented without commit point processing, can be run with needed commit point processing without having to modify the original batch application. Alternatively, commit point logic may also be deployed for a new batch application utilizing the teaching of the present invention. Accordingly, the many advantages associated with commit point processing discussed supra may be realized on a more timely schedule, with significantly less effort and greater reliability.

Various advantages and features of novelty, which characterize the present invention, are pointed out with particularity in the claims annexed hereto and form a part hereof. However, for a better understanding of the invention and its advantages, reference should be made to the accompanying descriptive matter, together with the corresponding drawings which form a further part hereof, in which there is described and illustrated specific examples in accordance with the present invention.

BRIEF DESCRIPTION OF THE DRAWINGS

The present invention is described in conjunction with the appended drawings, where like reference numbers denote the same element throughout the set of drawings:

FIG. 8 shows an exemplary linkage example for an auto-commit DLI handler;

FIG. 9 shows an exemplary linkage example for an auto-commit batch application.

DETAILED DESCRIPTION

The present invention overcomes the problems associated with the prior art by teaching a system, computer program product, and method for assisting database administrators and application programmers with the task of adding commit point processing to existing batch applications. Environmental factors and changes to enterprise objectives, as discussed in greater detail infra, may require that an existing batch application undergo modifications to incorporate commit point processing. This may be a tedious, error-prone process in the prior art as programmers struggle to comprehend the existing logic of a batch application, sometimes with little or no documentation, in order to orchestrate a complex set of required modifications.

Alternatively, the present invention may also be used to facilitate writing a new batch application, wherein many of the same efficiencies achieved in modifying a batch application to include commit point processing may also be achieved for a new batch application deploying commit point logic.

The teaching of the present invention provides for incorporating commit point processing into a batch application in a manner that is transparent to the batch application, thereby eliminating the tedious, error prone code modification process utilized in the prior art.

In the following detailed description, numerous specific details are set forth in order to provide a thorough understanding of the present invention. Those skilled in the art will recognize, however, that the teaching contained herein may be applied to other embodiments and that the present invention may be practiced apart from these specific details.

Accordingly, the present invention should not be limited to the embodiments shown but is to be accorded the widest scope consistent with the principles and features described herein. The following description is presented to enable one of ordinary skill in the art to make and use the present invention and is provided in the context of a patent application and its requirements.

Figure 1:
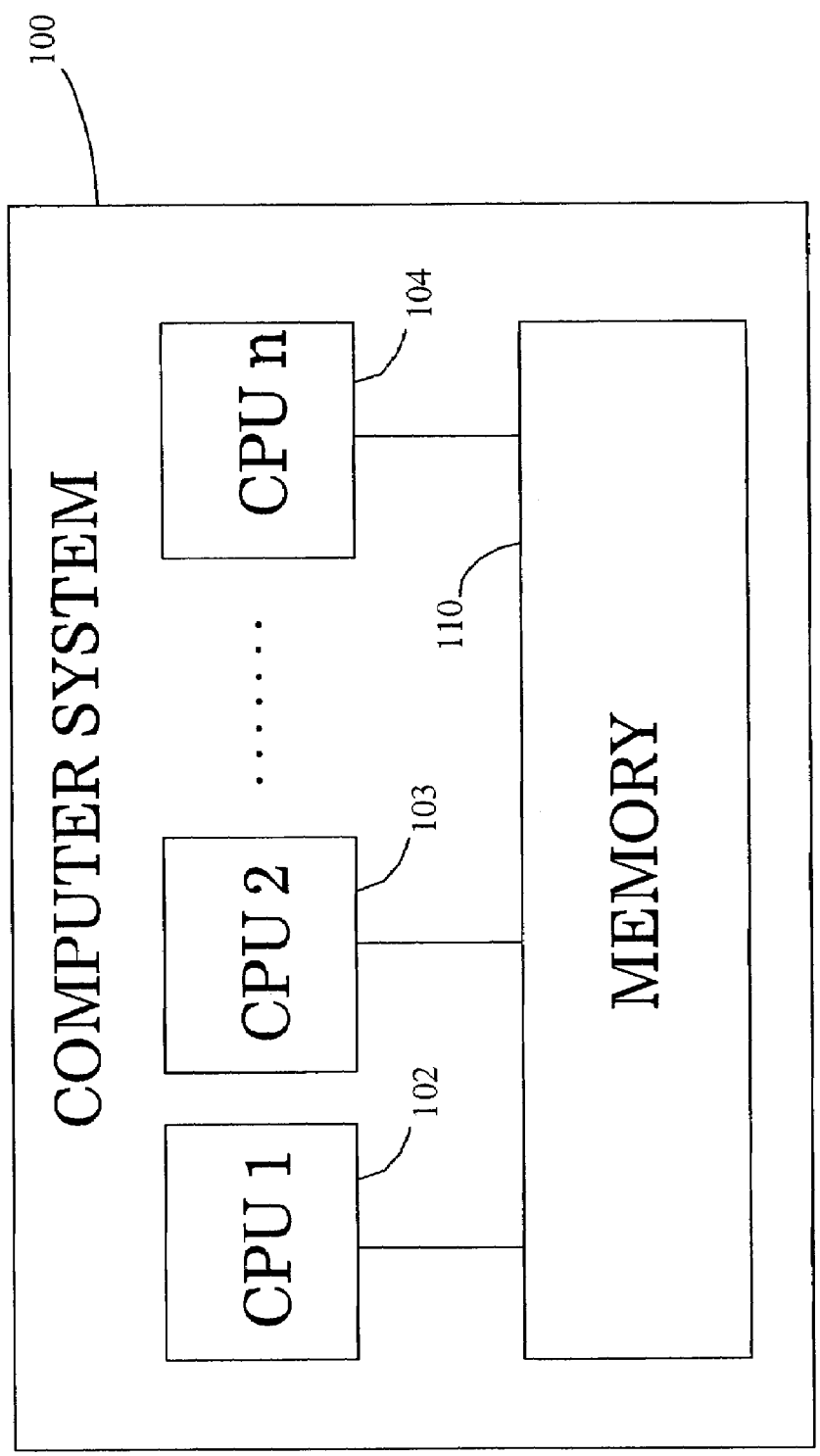
FIG. 1 is a block diagram of a typical computer system wherein the present invention may be practiced.

FIG. 1 is a block diagram of a computer system 100, such as the zSeries mainframe computer system. (zSeries is a trademark of International Business Machines Corporation in the United States, other countries, or both.) The computer system 100 comprises one or more central processing units (CPUs) 102, 103, and 104. The CPUs 102–104 suitably operate together in concert with memory 110 in order to execute a variety of tasks. In accordance with techniques known in the art, other components may be utilized with computer system 100, such as input/output devices comprising direct access storage devices (DASDs), printers, tapes, etc. (not shown). Although the present invention is described in a particular hardware environment, those of ordinary skill in the art will recognize and appreciate that this is meant to be illustrative and not restrictive of the present invention. Accordingly, other alternative hardware computing environments may be used without departing from the scope of the present invention.

Figure 2:
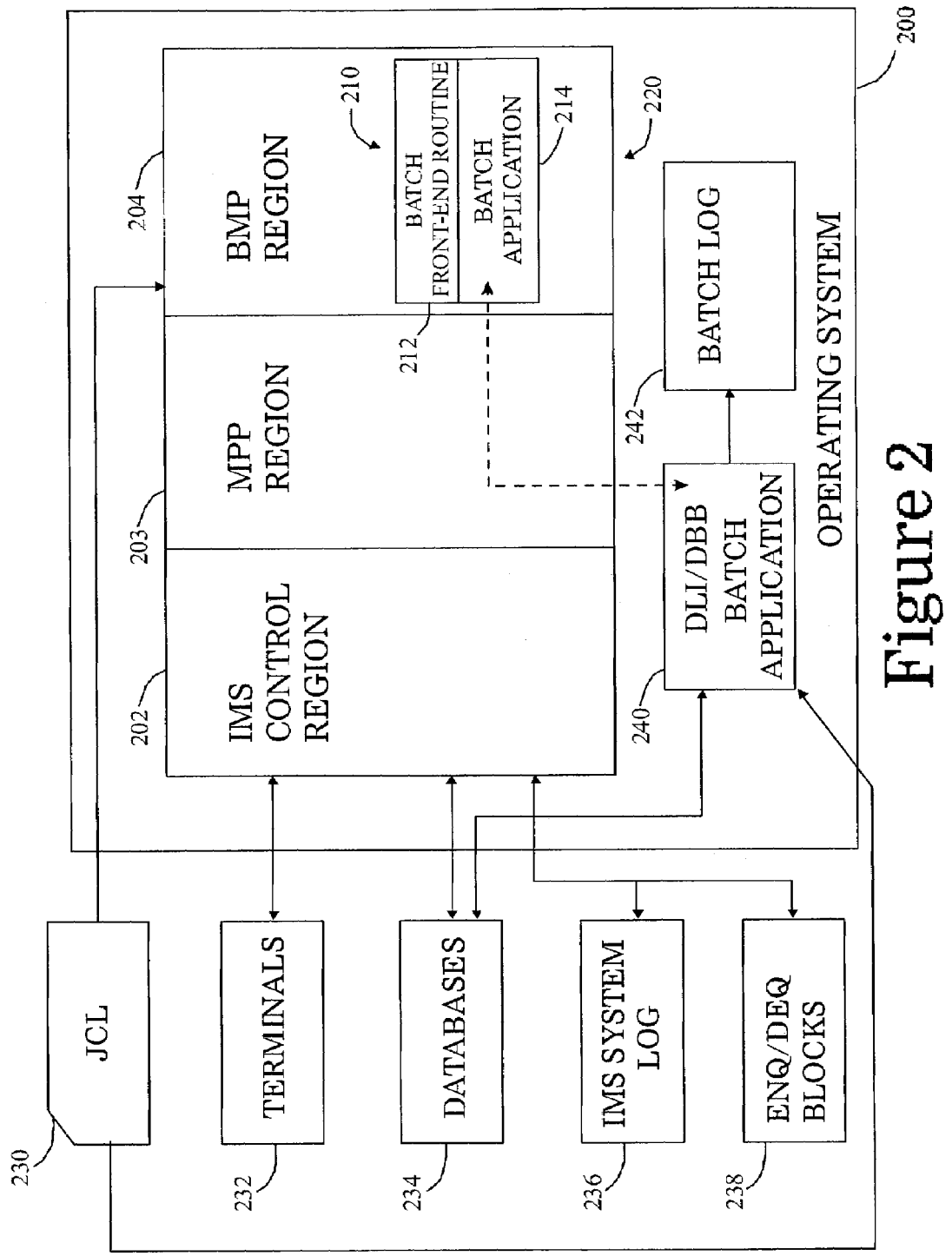
FIG. 2 is a block diagram of an exemplary IMS subsystem.

Referring now to FIG. 2, a block diagram is shown illustrating an exemplary operating system 200, such as the z/OS operating system, suitable for managing the resources of computer system 100 and providing the framework for running other computing subsystems and application programs. (z/OS is a trademark of International Business Machines Corporation in the United States, other countries, or both.) Subsystems functionally capable of being provided under the z/OS operating system include the IMS subsystem 220. The IMS subsystem 220 comprises an IMS Control region 202, which manages the region resources comprising Message Processing Program (MPP) region 203 and BMP region 204. Other resources that communicate with, or are managed by, IMS subsystem 220 comprise terminals 232, databases 234, system log 236, enqueue/dequeue blocks 238 and job control language (JCL) 230. Databases 234 may comprise several different types of IMS databases, such as DEDB, HDAM, HIDAM and HISAM.

DLI/DBB batch application 240, invoked via JCL 230, receives control from and executes under operating system 200. DLI/DBB Batch Application 240 does not use the services of IMS Subsystem 220. In this environment IMS subsystem 220 need not be present since DLI/DBB Batch Application 240 processes databases 234 directly without invoking the services of IMS Control Region 202 and utilizes a private batch log 242 in place of the IMS system log 236.

DLI/DBB batch application 240 is exemplary of a batch application that executes without the benefit of commit point processing. There are a variety of reasons why batch application 240 may be in need of modification or order to incorporate commit point processing. For example, a database processed by batch application 240 may grow in size over time such that higher processing volumes and longer execution times are encountered. In the absence of commit point processing, an enterprise may experience a significant recovery cost in the event batch application 240 abnormally terminates. This is because all of the work performed by batch application 240 must be backed out and redone going all the way back to the beginning of the batch application job. This may be an unacceptable impact for an enterprise, especially if batch application 240 is long running job.

Furthermore, it may be desirable for DLI/DBB batch application 240 to be converted to a BMP batch application. For example, program recovery procedures may be greatly simplified by changing from a DLI/DBB batch application to a BMP running under the IMS subsystem. This simplification occurs because the BMP execution environment provides for advanced logging capabilities utilizing a single system log as well as automatic data backout in the case of an abnormal termination. Furthermore, the ability to share critical IMS resources is enhanced under the IMS subsystem since resources may be locked and unlocked dynamically as required, rather than locking these resources for the entire duration of the DLI/DBB batch application.

However, converting and running a DLI/DBB batch application as a BMP application may encounter unwanted and unnecessary abnormal terminations when commit point processing is not being performed by the batch application. This is because, within the BMP online processing environment, enqueue/dequeue blocks must be periodically and timely released by the batch application to avoid exhaustion of the finite supply of these blocks, and it is commit point processing that is used to accomplish this periodic and timely release.

While a variety of reasons may exist for incorporating commit point processing into a batch application, as discussed supra, for illustrative purposes we assume that the enterprise needs to convert DLI/DBB batch application 240 to a BMP batch application, as represented by BMP batch application 214, and therefore, as discussed supra, may also find it highly desirable to incorporate commit point processing into batch application 214. Those skilled in the art will recognize that FIG. 2 is exemplary and that the teachings contained herein may also be applied to the incorporation of commit point processing into DLI/DBB batch application 240 without the further requirement to convert batch application 240 to a BMP batch application.

Batch application 214, converted from DLI/DBB batch application 240, is linked with batch front-end routine 212 to form auto-commit batch application 210. Auto-commit batch application 210 incorporates commit point processing in a manner that is transparent to batch application 214, as described in greater detail infra, whereby the frequently tedious and error-prone modifications to batch application 214 for the purpose of incorporating commit point processing is eliminated. Auto-commit batch application 210 executes within BMP region 204 in accordance with the present invention.

BMP batch application 210 is invoked as an auto-commit batch application via JCL 230 wherein batch front-end routine 212 first receives control and performs the novel processing described infra prior to invoking batch application 214. Those of ordinary skill in the art will recognize that FIG. 2 is exemplary in nature and that many other IMS subsystem configurations are possible within the scope of the present invention. For example, in an alternative configuration other IMS regions, such as an Interactive Fast Path (IFP) region, could also exist.

Generally, the novel methods herein disclosed may be tangibly embodied in and/or readable from a computer-readable medium containing the program code (or alternatively, computer instructions), which when read and executed by computer system 100 causes computer system 100 to perform the steps necessary to implement and/or use the present invention. Thus, the present invention may be implemented as a method, an apparatus, or an article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Examples of a computer readable device, carrier or media include, but are not limited to, palpable physical media such as a CD ROM, diskette, hard drive and the like, as well as other non-palpable physical media such as a carrier signal, whether over wires or wireless, when the program is distributed electronically.

Figure 3:
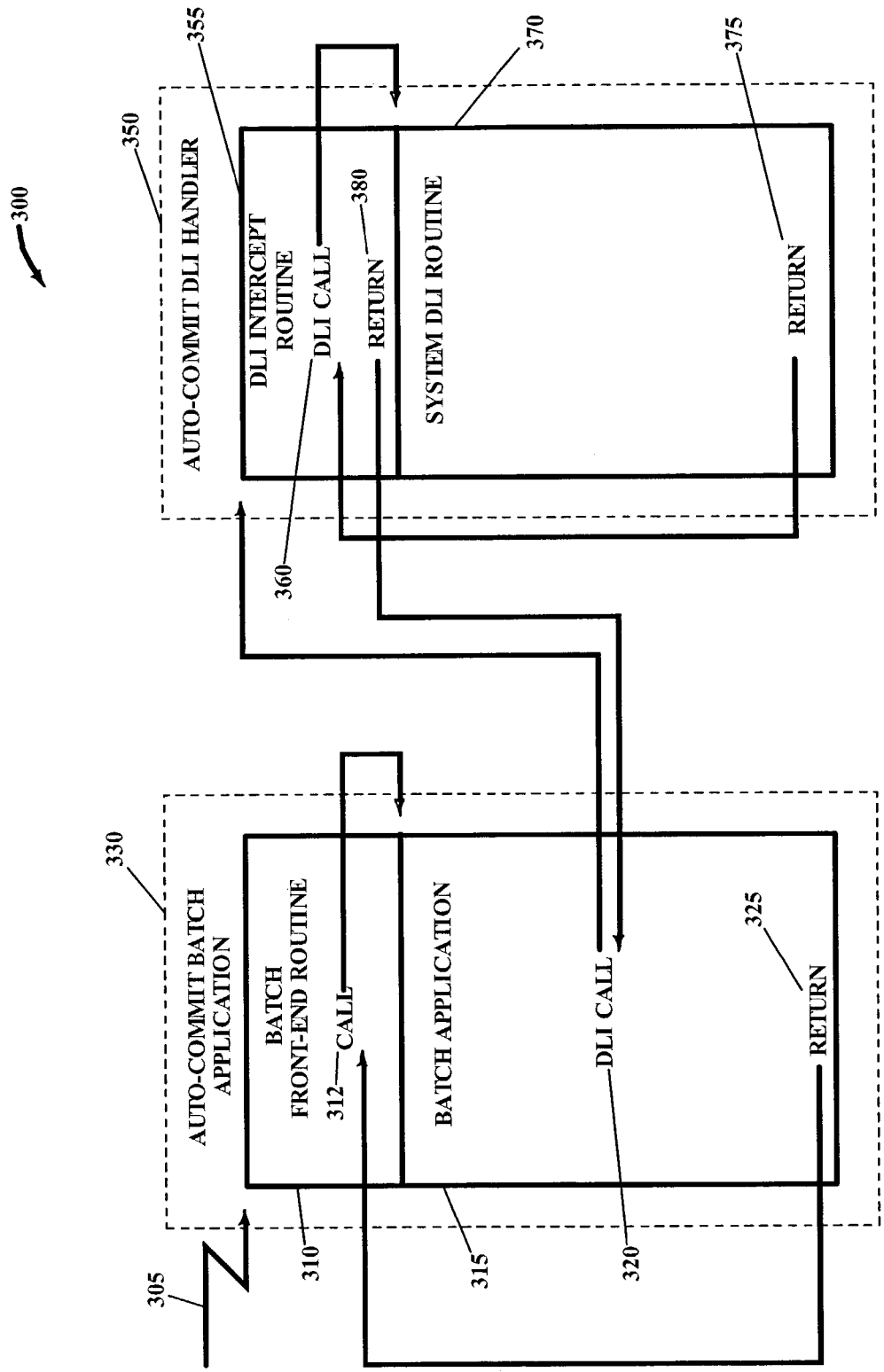
FIG. 3 is a block diagram of an auto-commit batch application and auto-commit DLI handler.

Referring now to FIG. 3, block diagram 300 illustrates the components and interrelationships between auto-commit batch application 330 and auto-commit DLI handler 350. Auto-commit batch application 330 comprises a load module formed by linking batch front-end routine 310 with batch application 315. This linkage, further described infra in conjunction with FIG. 9, provides for batch front-end routine 310 receiving control from the system as depicted by arrow 305 in place of batch application 315 receiving control.

Batch application 315 may be an existing BMP batch application or an existing DLI/DBB batch application. In either case, batch application 315, in an isolated state, is devoid of commit point processing. The teaching contained herein will show how to incorporate needed commit point processing into the execution of batch application 315 in a manner that is completely transparent to batch application 315 whereby the tedious and error prone procedure of modifying the existing code for batch application 315 is eliminated.

Figure 4:
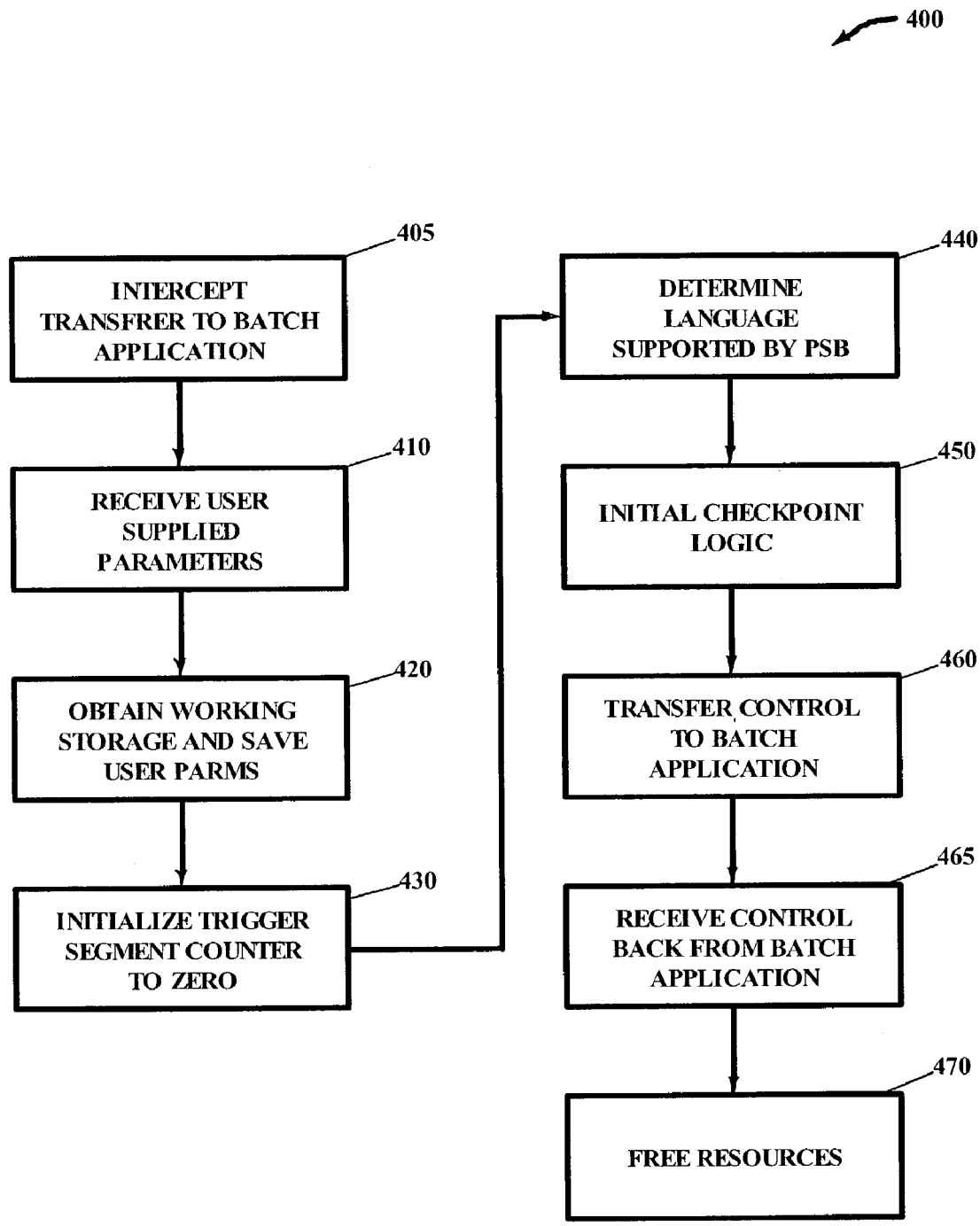
FIG. 4 is a flow diagram summarizing the initialization performed by one embodiment of the batch front-end routine.

Batch front-end routine 310, upon receiving control, performs various initialization processes, as described in more detail infra in conjunction with FIG. 4. Then, at CALL instruction 312, control passes to batch application 315 which will execute normally without any modifications to incorporate, or have awareness of, commit point processing (i.e. commit point processing is completely "transparent" to batch application 315). Batch application 315 at CALL instruction 320 requests DLI processing to access a hierarchical database. Rather than transferring control to system DLI routine 370, as occurs in the prior art, DLI intercept routine 355 receives control. This is accomplished, as described in more detail infra in conjunction with FIG. 8, by linking DLI intercept routine 355 with system DLI routine 370 to form a new load module, referred to herein as auto-commit DLI handler 350.

DLI intercept routine 355 receives control from batch application 315. Then, at CALL instruction 360, control passes to system DLI routine 370. System DLI routine 370 processes the original DLI request made by batch application 315. Upon completion of IMS system DLI processing, control returns to the instruction following CALL instruction 360. Upon receiving control back from system DLI routine 370, DLI intercept routine 355 performs commit point processing, as described infra in conjunction with FIG. 5. Upon completion of commit point processing, DLI intercept routine 355 returns control to the instruction following CALL instruction 320 within batch application 315. Batch application 315 is unaware of the additional commit point processing performed on its behalf by DLI intercept routine 355.

Batch application 315, upon completing all processing, returns to the instruction following CALL instruction 312 within batch front-end routine 310. Batch front-end routine 310 completes processing by freeing the various resources obtained during the commit point processing initialization phase and then returns control to the system caller. At this point, all commit point processing has been performed transparently to batch application 315; however, all of the commit point processing benefits that would otherwise be achieved by directly modifying batch application 315 to incorporate commit point processing directly therein are still achieved.

Figure 6:
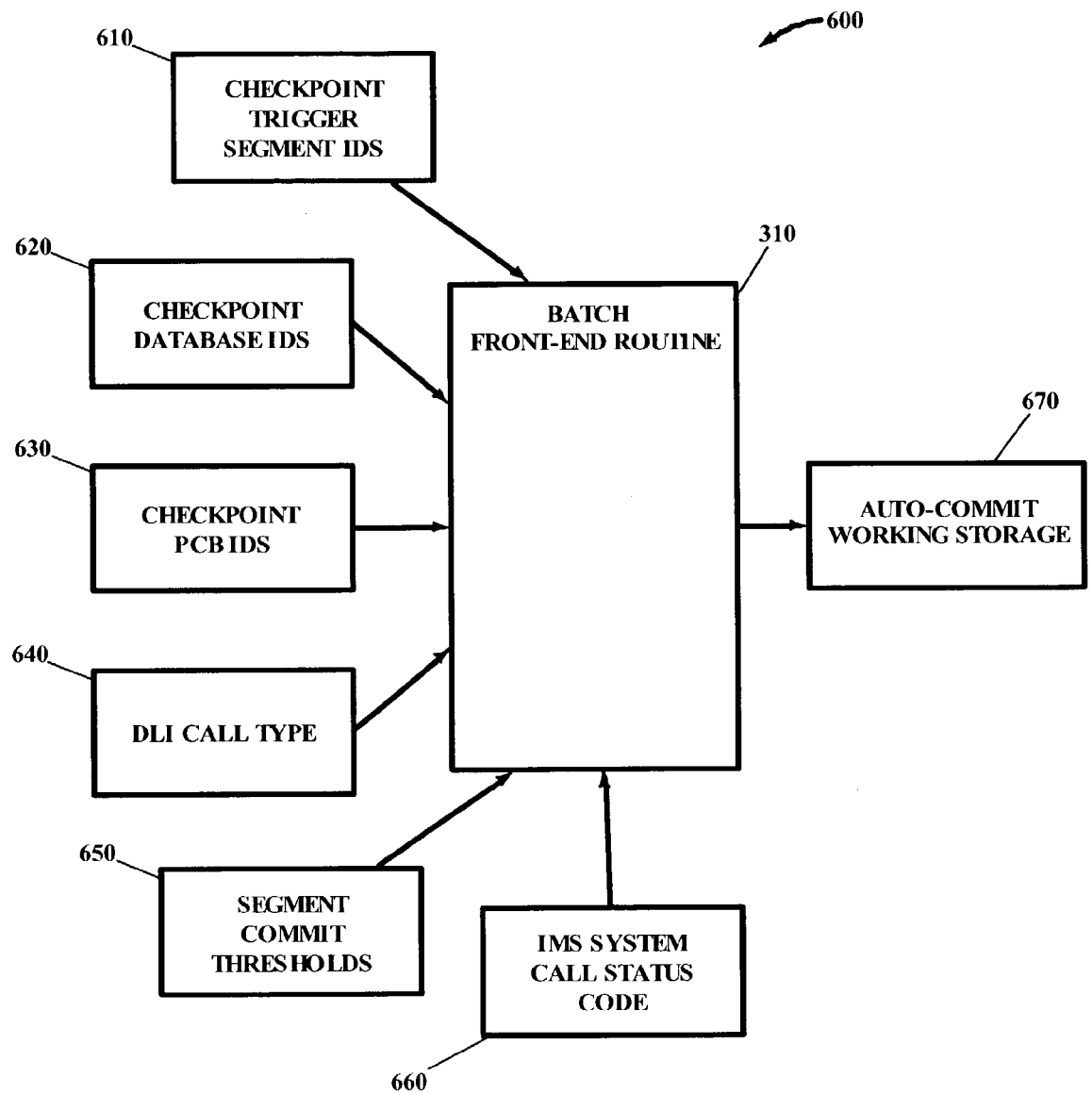
FIG. 6 shows exemplary inputs and outputs utilized by a batch front-end routine.
Figure 7:
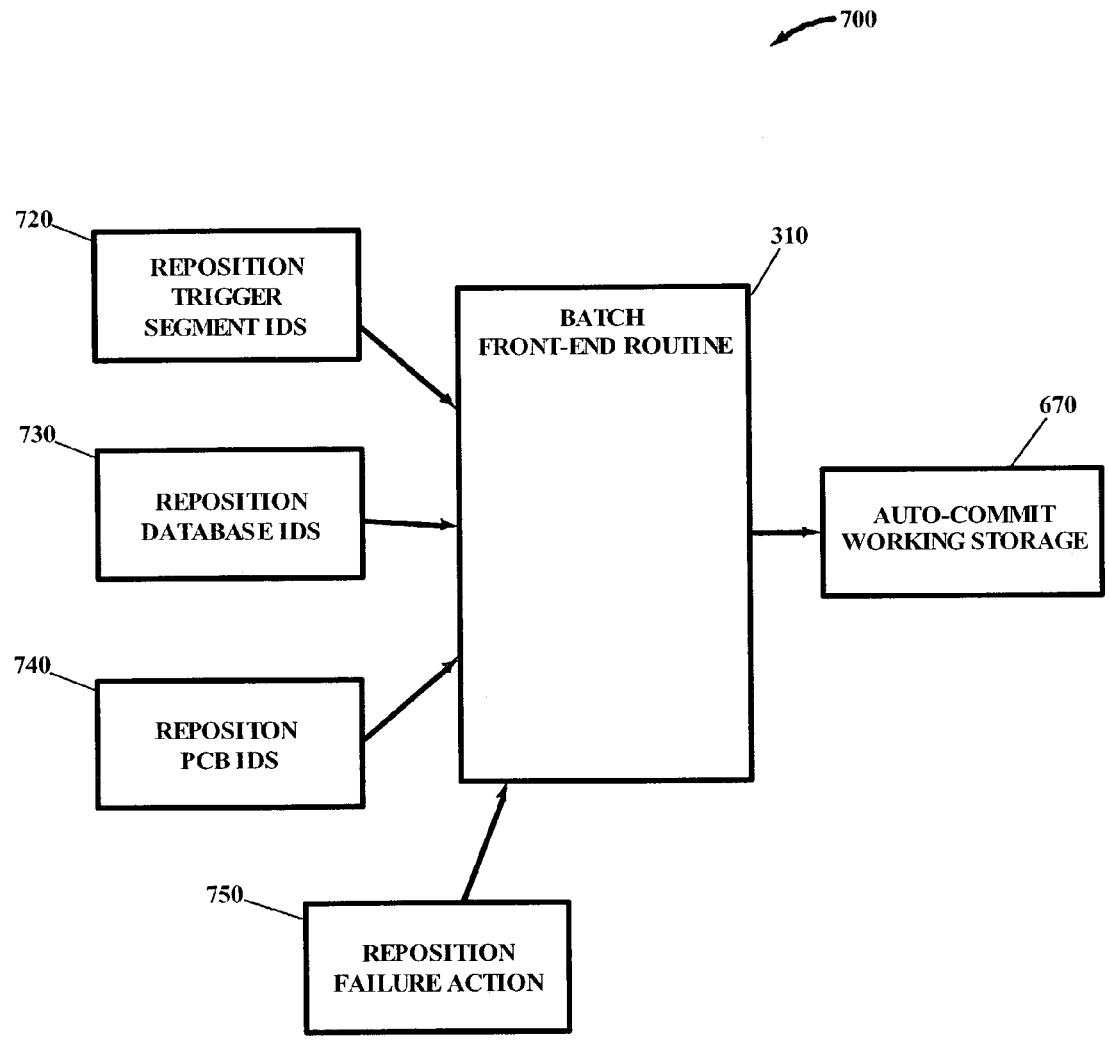
FIG. 7 shows additional exemplary inputs and outputs utilized by a batch front-end routine in support of database repositioning following commit processing.

Referring now to FIG. 4, in conjunction with FIG. 6 and FIG. 7, flow diagram 400 illustrates the program flow for one embodiment of auto-commit batch application 330. In step 405, the transfer of control to batch application 315 is intercepted by batch front-end routine 310. Batch front-end routine 310, in step 410, receives user-supplied parameters. Those of ordinary skill in the art will recognize that a variety of methods may be utilized to perform the communication of user parameters to a software routine. For example, this may be accomplished by a control data set containing various parameters that are self-describing, or known by pre-determined positional information. Alternatively, user parameters could also be supplied directly via JCL 230. These, and any other parameter passing schemas known in the art now or in the future are reasonable considered to be within the scope of the present disclosure.

Next, in step 420, auto-commit working storage 670 is obtained and user specified parameters are saved therein for later communication with DLI intercept routine 355. FIG. 6 illustrates exemplary user parameters to be saved in auto-commit working storage 670. Segment Ids 610, database Ids 620, PCB (Program Control Block) Ids 630, DLI call type 640, segment commit threshold 650 and IMS system status code 660 returned by system DLI routine 370 comprise information referred to herein as the "checkpoint trigger" discussed in greater detail infra in conjunction with FIG. 5.

FIG. 7 illustrates additional exemplary user parameters to be saved in auto-commit working storage 670 if optional database repositioning is desired. Segment Ids 720, database Ids 730, PCB Ids 740 and reposition failure action 750 comprise information referred to herein as the "reposition criteria" discussed in greater detail infra in conjunction with FIG. 5. In one embodiment, in the absence of database repositioning parameters, default processing will assume that repositioning is unconditionally required following a checkpoint in order to ensure the integrity of subsequent processing of batch application 315.

Continuing with step 430, a counter associated with each trigger segment 610, is initialized to zero. This counter is hereinafter referred to as a "trigger segment counter". A trigger segment is identified by a user as a segment that will control when commit point processing is to be performed, as described in greater detail infra in conjunction with FIG. 5. It will be appreciated by those of ordinary skill in the art that one or more trigger segments may be identified for the purpose of controlling commit point processing and that a counter will be initialized to zero for each such identified trigger segment.

In step 440, batch front-end routine 310 determines a supported language through examination of the Program Specification Block (PSB) associated with batch application 315. The PSB is generated for a particular language implementation, such as COBOL or Assembly language and thereby directs programming communications to occur in accordance with the standards of that particular language. Continuing with step 450, the initialization performed by batch front-end routine 310 includes performing initial checkpoint logic prior to any application database calls being issued, in accordance with proper IMS protocol known by those with ordinary skill in the art. The required restart and checkpoint calls are invoked with an interface appropriate to the particular language determined in step 440, supra.

In step 460, control is transferred to batch application 315. Upon the completion of processing of batch application 315, control returns to batch front-end routine 310 at step 465 where, in step 470, all resources previously obtained during the initialization phase of batch front-end routine 310 are released.

Figure 5:
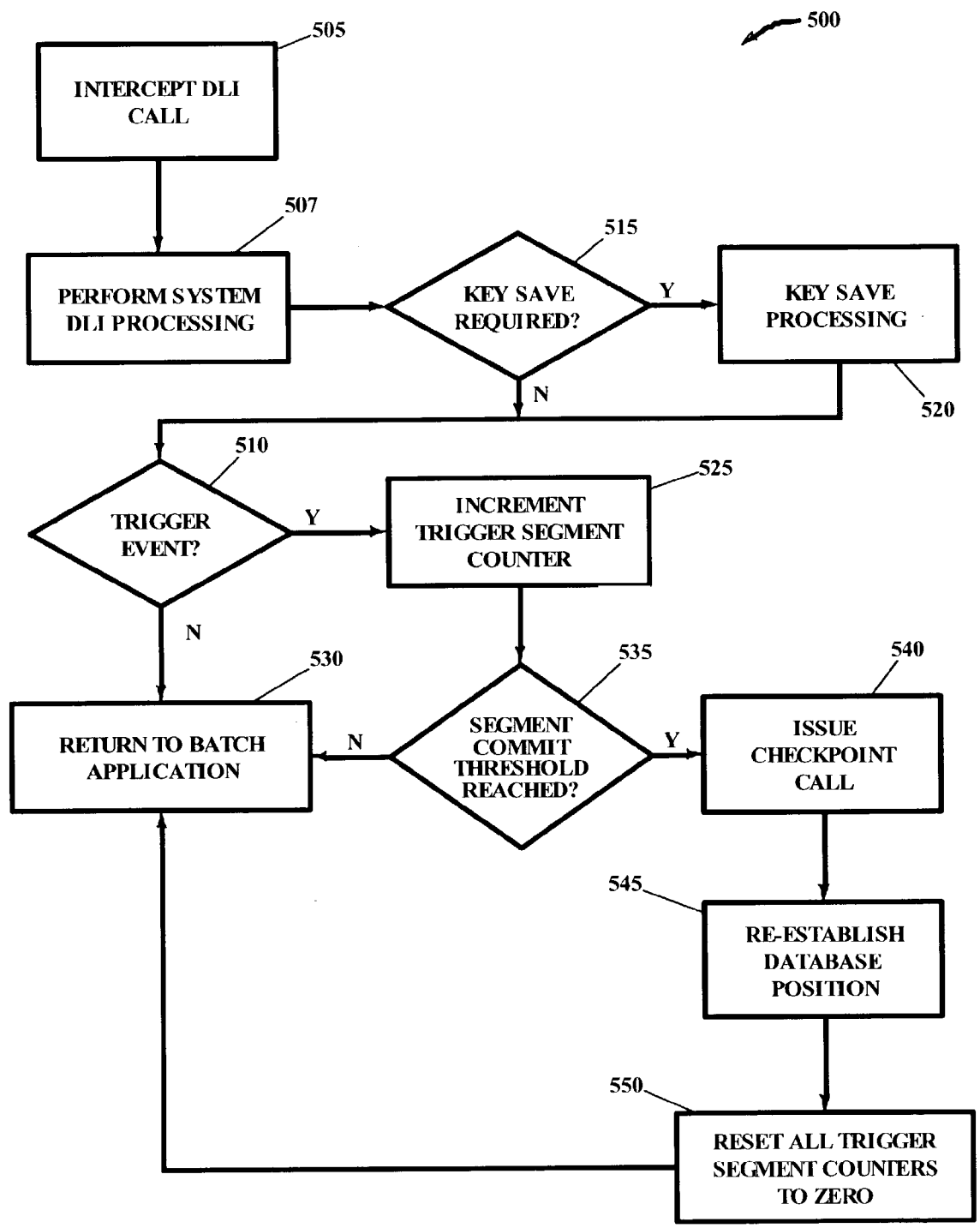
FIG. 5 is a flow diagram summarizing one embodiment of the DLI intercept routine.

Referring now to FIG. 5, flow diagram 500 illustrates the program flow for one embodiment of auto-commit DLI handler 350. In step 505, DLI intercept routine 355 receives control from batch application 315. In step 507, system DLI processing is performed by invoking system DLI routine 370. Next, in step 515 a test is made to determine if key save processing is required. Key save processing is required if repositioning criteria is specified and met. Reposition criteria comprises the identification of the database which requires repositioning, the identification of the Program Control Block (PCB) related to this database if multiple PCBs exist for this database in the PSB, and action to take if the repositioning process fails. Those of ordinary skill in the art will appreciate that the above reposition criteria elements are exemplary and that a reposition criteria utilizing different elements may be utilized.

Figure 10:
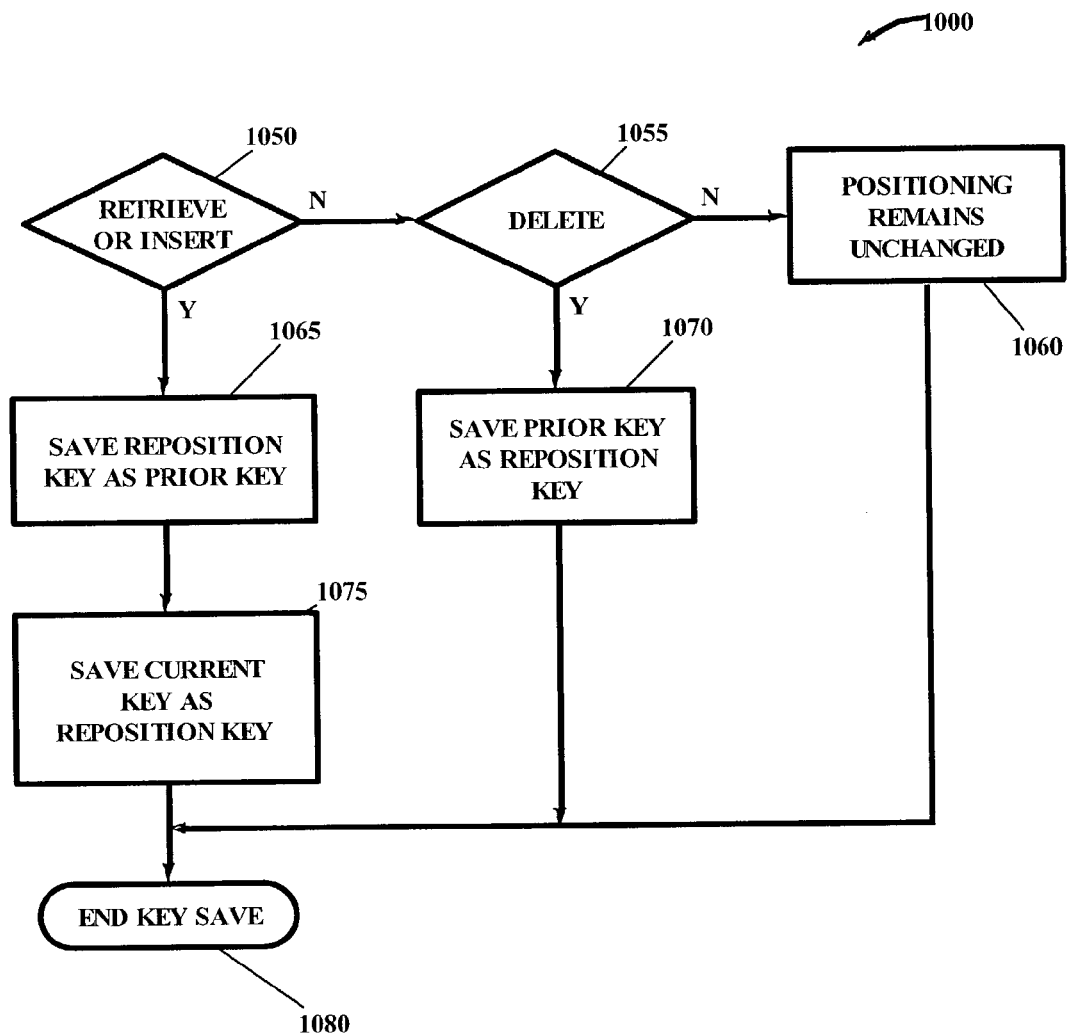
FIG. 10 is a flow diagram summarizing one embodiment of a key saving routine.

If reposition criteria has been specified and met, then in step 520 key save processing is performed prior to continuing with step 510, as discussed in more detail infra in conjunction with flow diagram 1000, FIG. 10. Otherwise processing continues directly with step 510. In an alternative embodiment, if reposition criteria is not specified, then step 520 is performed unconditionally. This may be done to ensure the integrity of subsequent processing by batch application 315 by ensuring proper database positioning even in those cases where repositioning specifications were erroneously omitted by the user. This alternative embodiment makes a trade-off in performance in order to accomplish greater ease of use and higher reliability.

Continuing now with step 510 a test is made to determine if this particular call represents a checkpoint trigger event. In one embodiment, a checkpoint trigger event occurs when a DLI call matches a checkpoint trigger. A checkpoint trigger comprises the name of the segment (or segments) whose processing drives the checkpoint process, the identification of the database to which the segment belongs, the identification of the PCB related to this database (in the case where there are multiple PCBs for this database in the PSB), a DLI call type and an IMS system call status code returned by system DLI routine 370. Those of ordinary skill in the art will appreciate that the above checkpoint trigger elements are exemplary and that a checkpoint trigger utilizing different elements may be utilized.

If it is not a trigger event, then, in step 530, control is returned to batch application 315 to continue with batch application processing. If it is a trigger event, then processing continues with step 525 wherein the trigger segment counter associated with the checkpoint trigger is incremented by one. Next, in step 535, a test is made to determine if the trigger segment counter is in a predetermined relation with the associated segment commit threshold 650. (The predetermined relation, in one exemplary embodiment, is an "equal" relation. In another exemplary embodiment, the predetermined relation is a "greater than" relation.) If the trigger segment counter is not in a predetermined relation with the associated segment commit threshold, then control passes to step 530, discussed supra. Otherwise, processing continues with step 540, where DLI intercept routine 355 issues a checkpoint call. Next, in step 545, the database position is reestablished, if required, utilizing key data recorded in process step 520, described supra. Positioning is reestablished to the original position status that existed prior to the checkpoint call of step 540. Then, in step 550, all trigger segment counters associated with the DLI call are reset to zero and processing continues with step 530, discussed supra.

Referring now to FIG. 10, flow diagram 1000 illustrates one embodiment of key save processing briefly discussed supra in the description of flow diagram 500, FIG. 5. In step 1050, a test is made to determine if the database access request is for a retrieve or an insert operation. If not, processing continues with step 1055 where a test is made to determine if the database access request is for a delete operation. If not, it is concluded in step 1060 that the current positioning for the database is valid and no further key save processing is required, wherein key save processing concludes at step 1080. Those of ordinary skill in the art will appreciate that database access operations, such as replace, do not change the current positioning of a database.

Returning now to step 1050, if the database access request is for a retrieve or insert operation, then processing continues with step 1065. Step 1065 saves the current "reposition" key as a "prior key" and then, in step 1075 the current database position key is saved as the current reposition key. Processing then concludes at step 1080, wherein key save processing is complete.

Returning now to step 1055, if the database access request is for a delete operation, then processing continues with step 1070. Step 1070 saves the prior key as the current reposition key. Those of ordinary skill in the art will recognize that when a database record is deleted the positioning of the database cannot be returned to the deleted record, which is why the prior key now reverts to the current reposition key. Those of ordinary skill in the art will further recognize that multiple PCBs may be associated with the PSB and that the aforementioned key save processing is performed on all associated PCBs. Processing then concludes at step 1080 wherein key save processing is complete.

Referring now to FIG. 8, exemplary linkage editor control statements 800 are illustrated that bind together DLI intercept routine 355 with system DLI routine 370 to form auto-commit DLI handler 350. Statement 802 directs operating system 200 to transfer control to linkage editor program IEWL. SYSLIB statement 804 identifies the dataset(s) from which the binder will locate routines that are required by the bind, but have not been otherwise uniquely specified in the input to the bind. In the exemplary example, this statement identifies the data set containing the IMS system modules.

CHKPTLIB statement 806 identifies the dataset which contains DLI intercept routine 355 and SYSLMOD statement 808 identifies the dataset into which the bound DLI intercept routine 355 will be placed The RESLIB statement 810 identifies the dataset containing additional IMS system modules. The SYSPRINT statement 812 identifies destination of the summary report created during bind processing. The SYSLIN statement 814 delineates the statements that follow 816–840 as control statements to further direct the bind operation.

Statements 816 and 818 are binder CHANGE statements that rename the existing entry points in the copy of the IMS system DLI routine 370 that is bound with DLI intercept routine 355. These existing entry points will be changed from their standard system name value (such as PLITDLI) to a value (such as PLITLI), which will be used internally by DLI intercept routine 355. INCLUDE statement 820 instructs the binder to include a copy of the system DLI routine 370 from the file identified by RESLIB statement 812.

Statements 822–826 are binder CHANGE statements that rename the existing entry points in DLI intercept routine 355 to the name values that match the original standard entry point name values in system DLI routine 370. Using this technique, the entry points which would ordinarily be invoked from batch application 315 are now only available in DLI intercept routine 355, which is the only routine that has access to the original entry points in the system DLI routine 370. INCLUDE statement 828 instructs the binder to include a copy of DLI intercept routine 355 from the file identified by CKPTLIB statement 806. Statements 830 through 836 identify alias name values for the resulting auto-commit DLI handler 350 load module, designated in statement 840 as routine CHKPLI000.

Referring now to FIG. 9, exemplary linkage editor control statements are illustrated that bind together batch front-end routine 310 with batch application 315 to form auto-commit batch application 330. Statement 902 directs operating system 200 to transfer control to linkage editor program IEWL. SYSLIB statement 904 identifies the dataset(s) from which the binder will locate routines that are required by the bind, but have not been otherwise uniquely specified in the input to the bind. In the exemplary example, this statement points to the dataset containing the IMS systems modules.

CKPTLIB statement 906 identifies the dataset that contains batch front end routine 310. APPLLIB statement 908 identifies the dataset containing batch application 315 and SYSLMOD statement 910 identifies the dataset in which batch application 315 is placed. SYSPRINT statement 912 identifies the destination of the summary report created during bind processing. The SYSLIN statement 914 delineates the statements that follow 916-924 as control statements to further direct the bind operation.

Statement 916 instructs the binder to include a copy of batch front end routine 310 from the file identified by CKPTLIB statement 906. Statement 918 is a binder CHANGE statement that renames the existing entry point for batch application 315 (identified by the character string "applent") to the constant name value "USERPGM". "USERPGM" is the name value utilized by batch front-end routine 310 to transfer control to batch application 315. Statement 920 instructs the binder to include a copy of the batch application 315 from the file identified by APPLLIB statement 908.

Statement 922 instructs the binder to establish the entry point name value of the newly bound auto-commit batch application 330 as CKPTASM. Those of ordinary skill in the art will appreciate that statement 922 is an exemplary statement for an assembler application program and that other entry point name values may be utilized for other application languages. Statement 924 identifies "applpgm", the auto-commit batch application 330, as the module being created by this bind procedure. The programmer implementing the teachings contained herein must change the character string "applpgm" to the chosen name for auto-commit batch application 330.

Taken in combination flow diagram 400 and 500, in conjunction with supporting diagrams and detailed descriptions, provide for improved productivity and enhanced reliability by facilitating the incorporation of commit point processing into a DLI/DBB batch application or a BMP batch application. Utilizing the teachings contained herein, commit point processing is automatically performed on behalf of a batch application in a manner that is transparent to the batch application. This transparency avoids the potential pitfalls discussed supra attendant with the modification of existing program code, as well as the development of new code. The advantages of the present teachings are especially valuable in those environments where an existing batch application is inadequately documented and/or the original creators of the software are no longer available to the enterprise for technical consultation.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. § 112, sixth paragraph, unless the element is expressly recited using the phrase "means for" or "step for."

While the preferred embodiment of the present invention has been described in detail, it will be understood that modification and adaptations to the embodiment(s) shown may occur to one of ordinary skill in the art without departing from the scope of the present invention as set forth in the following claims. Thus, the scope of this invention is to be construed according to the appended claims and not just to the specific details disclosed in the exemplary embodiments.

The invention claimed is:

1. A method for automatically performing on a computer system commit point processing for a batch application, said method comprising:
   intercepting a transfer of control to said batch application;
   establishing a checkpoint trigger from user supplied data;
   determining a supported language;
   deploying initial checkpoint logic using an interface consistent with said supported language;
   resuming said transfer of control to said batch application;
   intercepting a Data Language One (DLI) call from said batch application wherein said Data Language One call is made for the purpose of accessing a hierarchical database;
   determining if said access to said hierarchical database is a checkpoint trigger event;
   incrementing a segment counter for a trigger segment in said checkpoint trigger for said checkpoint trigger event if said trigger segment is identified by said Data Language One call;
   comparing said segment counter to a segment commit threshold in said checkpoint trigger; and
   performing commit point processing on behalf of said batch application if said segment counter is in a predetermined relation to said segment commit threshold.

2. The method of claim 1 wherein said predetermined relation comprises an equal condition, a greater-than condition or an equal-to-or-greater-than condition.

3. The method of claim 1 wherein said batch application is an IMS BMP batch application.

4. The method of claim 1 wherein said batch application is an IMS Data Language One application or an IMS DBB application.

5. The method of claim 1 further comprising restoring the positioning of said hierarchical database to the state that existed immediately preceding said commit point processing.

6. The method of claim 5 further comprising utilizing repositioning data supplied by a user to determine if said restoration of positioning of said hierarchical database is required.

7. The method of claim 5 further comprising collecting information from a PCB associated with said Data Language One call prior to said performing of said commit point processing wherein said information is utilized to perform said restoration of positioning of said hierarchical database.

8. The method of claim 1 wherein said trigger segment is one of a plurality of trigger segments in said checkpoint trigger.

9. A method for executing a batch application wherein commit point processing is automatically performed without modifying said batch application, comprising the steps of:
   identifying at least one trigger segment;
   establishing a segment commit threshold associated with said at least one trigger segment;
   linking a batch front-end routine with said batch application to form an auto-commit batch application, said batch front-end routine having access to said identification of said at least one trigger segment and access to said segment commit threshold;

linking a Data Language One intercept routine with a system Data Language One routine to form an auto-commit Data Language One handler;

identifying said auto-commit batch application on a Job Control Language EXEC statement; and submitting a job comprising said Job Control Language EXEC statement for execution, whereby Data Language One calls from said auto-commit batch application are intercepted by said auto-commit Data Language One handler to process said Data Language One calls and automatically perform said commit point processing on behalf of said batch application in accordance with a predetermined relation between said at least one trigger segment and said segment commit threshold.

10. A computer system for automatically performing commit point processing for a batch application, said computer system comprising:

a computer;

an auto-commit batch application comprising a batch front-end routine and said batch application wherein said batch front-end routine intercepts a transfer of control to said batch application, and wherein said batch front-end routine establishes a checkpoint trigger from user supplied data, and wherein said batch front-end routine determines a supported language, and wherein said batch front-end routine deploys initial checkpoint logic using an interface consistent with said supported language, and wherein said batch front-end routine transfers control to said batch application;

an auto-commit Data Language One handler, wherein said auto-commit Data Language One handler comprises a Data Language One intercept routine and a system Data Language One routine, said Data Language One intercept routine intercepting a Data Language One call from said batch application;

and wherein said Data Language One call is made for the purpose of accessing a hierarchical database;

and wherein said Data Language One intercept routine determines if said access to said hierarchical database is a checkpoint trigger event;

and wherein said Data Language One intercept routine increments a segment counter for a trigger segment in said checkpoint trigger for said checkpoint trigger event if said trigger segment is identified by said Data Language One call;

and wherein said Data Language One intercept routine compares said segment counter to a segment commit threshold in said checkpoint trigger; and wherein said Data Language One intercept routine performs commit point processing on behalf of said batch application if said segment counter is in a predetermined relation to said segment commit threshold.

11. An article of manufacture for use in a computer system tangibly embodying computer instructions executable by said computer system to perform process steps for automatically performing commit point processing for a batch application, said process steps comprising:

intercepting a transfer of control to said batch application;

establishing a checkpoint trigger from user supplied data;

determining a supported language;

deploying initial checkpoint logic using an interface consistent with said supported language;

resuming said transfer of control to said batch application;

intercepting a Data Language One call from said batch application wherein said Data Language One call is made for the purpose of accessing a hierarchical database;

determining if said access to said hierarchical database is a checkpoint trigger event;

incrementing a segment counter for a trigger segment in said checkpoint trigger for said checkpoint trigger event if said trigger segment is identified by said Data Language One call;

comparing said segment counter to a segment commit threshold in said checkpoint trigger; and performing commit point processing on behalf of said batch application if said segment counter is in a predetermined relation to said segment commit threshold.

12. The article of manufacture of claim 11 wherein said predetermined relation comprises an equal condition, a greater-than condition or an equal-to-or-greater-than condition.

13. The article of manufacture of claim 11 wherein said batch application is an IMS BMP batch application.

14. The article of manufacture of claim 11 wherein said batch application is an IMS Data Language One application or an IMS DBB application.

15. The article of manufacture of claim 11 further comprising restoring the positioning of said hierarchical database to the state that existed immediately preceding said commit point processing.

16. The article of manufacture of claim 15 further comprising utilizing repositioning data supplied by a user to determine if said restoration of positioning of said hierarchical database is required.

* * * * *